(12) United States Patent
Bianchi et al.

(10) Patent No.: US 10,156,301 B2
(45) Date of Patent: Dec. 18, 2018

(54) UNDERWATER PIPELINE SUPPORT, AND SYSTEM AND METHOD FOR SETTING UP SUCH A SUPPORT

(71) Applicant: SAIPEM S.p.A., San Donato Milanese (IT)

(72) Inventors: Stefano Bianchi, Cernusco Sul Naviglio (IT); Mauro Mottini, Travaco' Siccomario (IT)

(73) Assignee: Saipem S.p.A., San Donato Milanese (IT)

( * ) Notice: Subject to any disclaimer, the term of this patent is extended or adjusted under 35 U.S.C. 154(b) by 0 days.

(21) Appl. No.: 15/523,566

(22) PCT Filed: Nov. 3, 2015

(86) PCT No.: PCT/IB2015/058502
§ 371 (c)(1),
(2) Date: May 1, 2017

(87) PCT Pub. No.: WO2016/071841
PCT Pub. Date: May 12, 2016

(65) Prior Publication Data
US 2017/0307106 A1 Oct. 26, 2017

(30) Foreign Application Priority Data
Nov. 3, 2014 (IT) .............................. MI2014A1880

(51) Int. Cl.
*F16L 3/12* (2006.01)
*F16L 1/20* (2006.01)
(Continued)

(52) U.S. Cl.
CPC ...... *F16L 3/12* (2013.01); *F16L 1/16* (2013.01); *F16L 1/20* (2013.01); *F16L 1/18* (2013.01)

(58) Field of Classification Search
CPC ................................... F16L 3/12; F16L 1/235
See application file for complete search history.

(56) References Cited

U.S. PATENT DOCUMENTS

| 3,860,122 A | * | 1/1975 | Cernosek | .................. E02D 7/16 |
| | | | | 173/90 |
| 4,146,345 A | | 3/1979 | Silvestri | |

(Continued)

FOREIGN PATENT DOCUMENTS

| GB | 1564493 | * | 1/1978 |
| GB | 2 423 778 | | 9/2006 |

(Continued)

OTHER PUBLICATIONS

Notification Concerning Submission, Obtention or Transmittal of Priority Document for International Application No. PCT/IB2015/058502 dated Nov. 27, 2015.
(Continued)

*Primary Examiner* — Sean D Andrish
(74) *Attorney, Agent, or Firm* — Neal, Gerber & Eisenberg LLP

(57) ABSTRACT

A support for an underwater pipeline, in particular configured to elevate an underwater pipeline on a bed of a body of water, with a connecting frame configured to fit to a portion of underwater pipeline extending along a longitudinal axis; and at least two legs, which are hinged to the connecting frame, and movable between a contracted configuration and an extended configuration in which they extend crosswise to the underwater pipeline to rest on the bed of the body of water.

39 Claims, 6 Drawing Sheets

(51) Int. Cl.
*F16L 1/16* (2006.01)
*F16L 1/18* (2006.01)

(56) References Cited

U.S. PATENT DOCUMENTS

| | | | |
|---|---|---|---|
| 4,147,455 A | | 4/1979 | Bertaccini |
| 4,355,926 A | * | 10/1982 | Rognoni .................. F16L 1/20 |
| | | | 248/49 |
| 5,263,796 A | | 11/1993 | de Waal |
| 5,290,127 A | | 3/1994 | Foster et al. |
| 5,890,841 A | * | 4/1999 | Friis ........................ H02G 1/10 |
| | | | 294/66.1 |
| 7,267,066 B2 | * | 9/2007 | Derner ...................... B63C 3/06 |
| | | | 114/48 |
| 2013/0170914 A1 | * | 7/2013 | Critsinelis ................. F16L 1/24 |
| | | | 405/172 |
| 2013/0309015 A1 | * | 11/2013 | Mille .................. E21B 41/0007 |
| | | | 405/168.1 |
| 2014/0093317 A1 | | 4/2014 | Restivo et al. |

FOREIGN PATENT DOCUMENTS

| WO | WO 94/08166 | 4/1994 |
|---|---|---|
| WO | WO 2011/061605 | 5/2011 |

OTHER PUBLICATIONS

International Search Report and Written Opinion for International Application No. PCT/IB2015/058502 dated Mar. 18, 2016.

\* cited by examiner

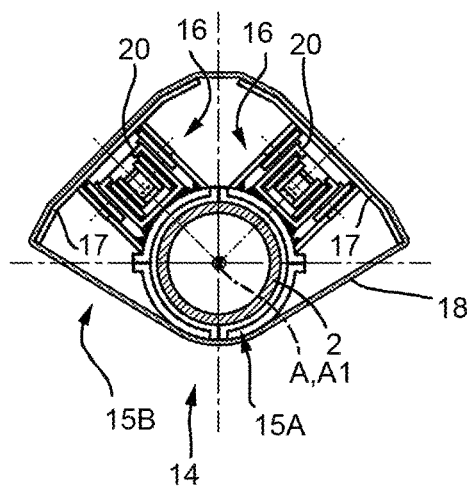
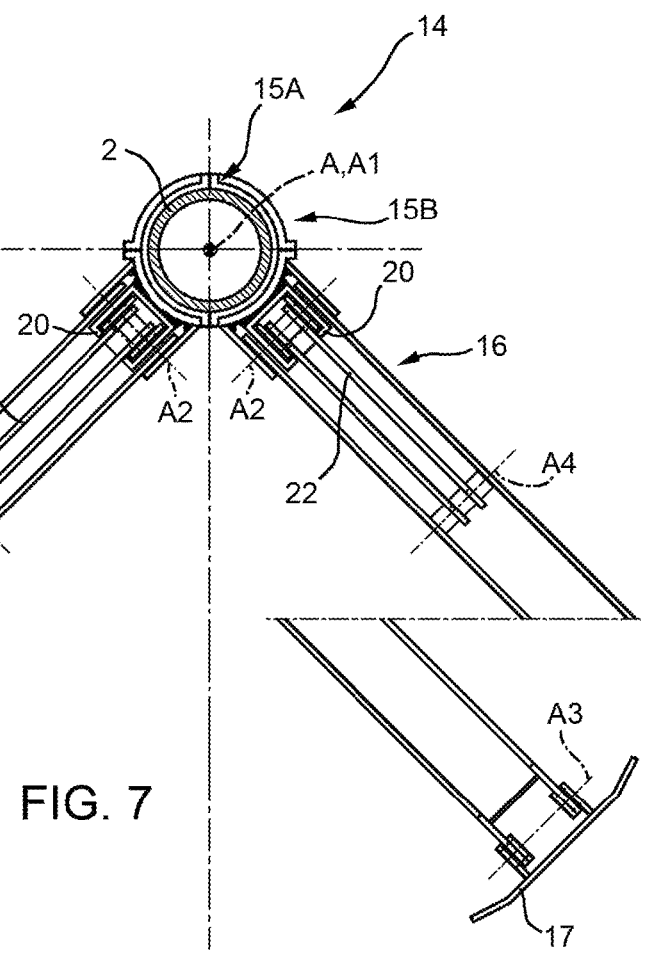

UNDERWATER PIPELINE SUPPORT, AND SYSTEM AND METHOD FOR SETTING UP SUCH A SUPPORT

PRIORITY CLAIM

This application is a national stage application of PCT/IB2015/058502, filed on Nov. 3, 2015, which claims the benefit of and priority to Italian Patent Application No. MI2014A001880, filed on Nov. 3, 2014, the entire contents of which are each incorporated by reference herein.

BACKGROUND

An underwater pipeline, once laid on the bed of the body of water, assumes a configuration imposed by the points or areas that support the underwater pipeline. The laying of an underwater pipeline consequently envisages an accurate preliminary study for a path that avoids the pipeline having spanned portions, or rather spanned portions of excessive length, once laid.

Sometimes, the preferable path has portions along which ridges and depressions alternate. In these cases, the morphology of the bed imposes carrying out specific operations to reduce the length of any such spans. A known technique is to carry out operations preparatory to laying the underwater pipeline, such as flattening out the ridges and filling the depressions for example.

In other cases where the bed of the body of water does not have significant discontinuities, it is sufficient to dig a trench in such a way as to create a bathymetric profile for the bottom of the trench as even as possible, as shown in PCT Patent Application No. WO 2011/061,605 and in the name of the applicant.

Another known technique aimed at rectifying bathymetric profiles characterized by marked variability provides for arranging at least one support in a depression between two successive ridges to provide a further point of support for the underwater pipeline and reduce the length of the free-span portion of the underwater pipeline and, in consequence, stress on the underwater pipeline.

A support of the above-indicated type is shown in U.S. Patent Application Publication No. 2014/093317. This support is preliminarily arranged in a given zone of the bed of the body of water and comprises a vertical structure, a carriage selectively movable in a vertical direction along the vertical structure, and a cradle configured to accommodate the underwater pipeline. The underwater pipeline is placed in the cradle, which is selectively positioned at a desired height with respect to the bed of the body of water.

A support, based on a similar principle to the previous one is described in U.S. Pat. No. 4,147,455.

PCT Patent Application No. WO 94/08166 shows a straddle carrier, which is laid on the bed straddling the underwater pipeline and is provided with a gripper element capable of grasping a portion of the underwater pipeline and raising this portion until the underwater pipeline reaches a desired height.

The described supports must be arranged inside a predetermined area and the underwater pipeline must then be coupled to the support.

These operations are relatively costly in terms of time and complicate the laying operations of the underwater pipeline.

SUMMARY

The present disclosure relates to a support for an underwater pipeline, in particular for elevating an underwater pipeline on a bed of a body of water.

The advantage of the present disclosure is to provide a support for an underwater pipeline that is capable of overcoming certain of the drawbacks of certain of the known art.

In accordance with the present disclosure, a support is provided for an underwater pipeline, in particular a support configured to elevate an underwater pipeline on a bed of a body of water, the support comprising a connecting frame extending along a first axis and configured to fit to a portion of pipeline extending along a longitudinal axis, so that the first axis is substantially parallel to the longitudinal axis of the pipeline; and at least two legs, which are hinged to the connecting frame about second axes, and movable between a contracted configuration and an extended configuration in which they extend crosswise to the pipeline to rest on the bed of the body of water.

The possibility of arranging the support in a contracted configuration enables relatively easy launching of the support together with the underwater pipeline.

In accordance with the present disclosure, the second axes are crosswise to the first axis, so that, in the contracted configuration, the legs are substantially parallel to the underwater pipeline. In this way, it is possible to significantly reduce the space occupied by the support.

In accordance with the present disclosure, the connecting frame comprises a gripping member and a hub, which is coupled to the gripping member in a rotatable manner and configured to support the legs. In this way, the legs can be oriented with respect to the gripping member according to requirements.

In accordance with the present disclosure, the support comprises at least two feet, each of which is configured to rest on the bed of the body of water, is hinged to the end of a respective leg about a third axis and is movable between a contracted position, in which each foot is substantially parallel to the respective leg, and an operational position, in which each foot extends crosswise to the respective leg. In this way, the space occupied by the foot can also be minimized in the contracted configuration of the support.

In accordance with the present disclosure, each leg is adjustable in length. In this way, it is possible to support the underwater pipeline in an appropriate manner and adapt the length of each leg to the configuration of the bed.

In particular, each leg comprises an adjusting mechanism configured to adjust the length of the leg. It should be appreciated that each leg can be adjusted independently of the other leg via the respective adjusting mechanism, which comprises a power take-off connection.

In accordance with the present disclosure, the support comprises at least one sensor for each leg configured to detect a signal related to the load applied along the respective leg. Once these signals are known, it is possible to adjust the length of the legs to distribute the loads on the legs in a balanced manner.

In accordance with the present disclosure, the support comprises a stop device configured to arrest the legs in the extended configuration. In this way, accidental bending of the legs and failure of the underwater pipeline support function is reduced or avoided.

In particular, the stop device comprises a guide; a runner movable along the guide; an arm hinged to the runner and to the leg; and a non-return mechanism located along the guide and configured to form a coupling with the runner.

In accordance with the present disclosure, the legs are hinged to the connecting frame so that the transition from the contracted configuration to the extended configuration occurs by gravity, once the free ends of the legs are released. In practice, the force of gravity is able to open out the legs and the feet of the support.

In accordance with an alternative embodiment of the disclosure, the support comprises an opening mechanism configured to move the legs from the contracted configuration to the extended configuration. In this way, it is possible to actively control the complete deployment of the support.

The opening mechanism is completely mechanical and comprises a screw and a nut screw that is movable along the screw and connected to at least one leg. In this case, the screw can be operated by an underwater vehicle.

Alternatively, the opening mechanism comprises a hydraulic cylinder comprising a rod connected to at least one leg. In this case, the hydraulic cylinder can be operated either by the underwater vehicle or by an energy reserve mounted on the support.

In this case, the cylinder is operated by an automatic device configured to operate the hydraulic cylinder on the basis of the pressure in the body of water. In practice, the opening mechanism comprises a reservoir with a pressurized fluid (i.e., an energy reserve); a valve placed between the reservoir and the hydraulic cylinder; a pressure sensor; and a transducer to open the valve on the basis of the pressure value.

A further advantage of the present disclosure is to provide a system configured to set up a support for an underwater pipeline that does not have certain of the drawbacks of certain of the known art.

In accordance with the present disclosure, a system is provided for setting up a support for an underwater pipeline as disclosed herein, the system comprising a laying vessel; an underwater pipeline that is laid on the bed of the body of water by the laying vessel; and a crane configured to fit the support to a designated or given portion of the underwater pipeline on the laying vessel, so as to lay the support within a predetermined area on the bed of the body of water through the laying of the underwater pipeline. In this way, the underwater pipeline becomes the tool through which the support is launched and laid. The system forming the subject of the present disclosure permits relatively significant time savings because the laying of the underwater pipeline and the support are performed simultaneously and it is not necessary to arrange the underwater pipeline over supports previously laid on the bed of the body of water.

In accordance with the disclosure, the system comprises a lock member configured to keep the support in the contracted configuration and be selectively removed to enable the support to assume the extended configuration.

The unlocking of the support is performed in a specific launching step: in a first step, the contracted configuration facilitates passage of the underwater pipeline and the associated support along a launching ramp, whereas in a second step, the structure must be opened out into the extended configuration before touching the bed of the body of water.

In accordance with the present disclosure, the system comprises an underwater vehicle configured to assist the laying operations of the support and/or supply power to the support. The underwater vehicle, in particular a remotely operated vehicle ("ROV"), has the function of monitoring the laying of the underwater pipeline and the support to detect any anomalies.

In this specific case, the underwater vehicle has the function of removing the lock member.

Other possible functions of the underwater vehicle are the supply of power to the support in its deployment step and/or in the height adjustment step.

A further advantage of the present disclosure is to provide a method for setting up a support for an underwater pipeline that does not have certain of the drawbacks of certain of the known art.

In accordance with the present disclosure, a method is provided for setting up a support for an underwater pipeline as disclosed herein, the method comprising the steps of fitting the support to a designated or given portion of an underwater pipeline on a laying vessel and a lock member configured to keep the support in the contracted configuration; launching the underwater pipeline and the support from the laying vessel into the body of water; and laying the support on a predetermined area of the bed of the body of water via the underwater pipeline.

Thanks to the present disclosure, the underwater pipeline becomes the tool configured to lay the support, with the associated advantages.

In accordance with the present disclosure, the method provides for adjusting the height of the support once the support has been laid on the bed of the body of water.

This operation enables optimizing the support of the underwater pipeline.

In particular, the method provides for acquiring at least one signal related to the load exchanged between the underwater pipeline and the bed of the body of water, and adjusting the height of the support on the basis of said signal. In this way, it is possible to set the height based on the loads that bear upon the support.

In particular, the method provides for acquiring a signal related to the load on each leg, and adjusting the length of the legs based on signals acquired to adjust the height of the support. In this way, it is possible to balance the loads on the legs and ensure greater stability of the support and even distribution of the stress along the support.

Additional features and advantages are described in, and will be apparent from the following Detailed Description and the figures.

BRIEF DESCRIPTION OF THE DRAWINGS

Further characteristics and advantages of the present disclosure will become clear from the description below of certain embodiments, with reference to the figures in the accompanying drawings, in which:

FIG. 6 is an elevation view, with parts removed for clarity, parts in section and on an enlarged scale, of the support in FIG. 1 in a contracted configuration;

FIG. 7 is an elevation view, with parts removed for clarity, parts in section and on an enlarged scale, of the support in FIG. 1 in an extended configuration;

DETAILED DESCRIPTION

Figure 1:
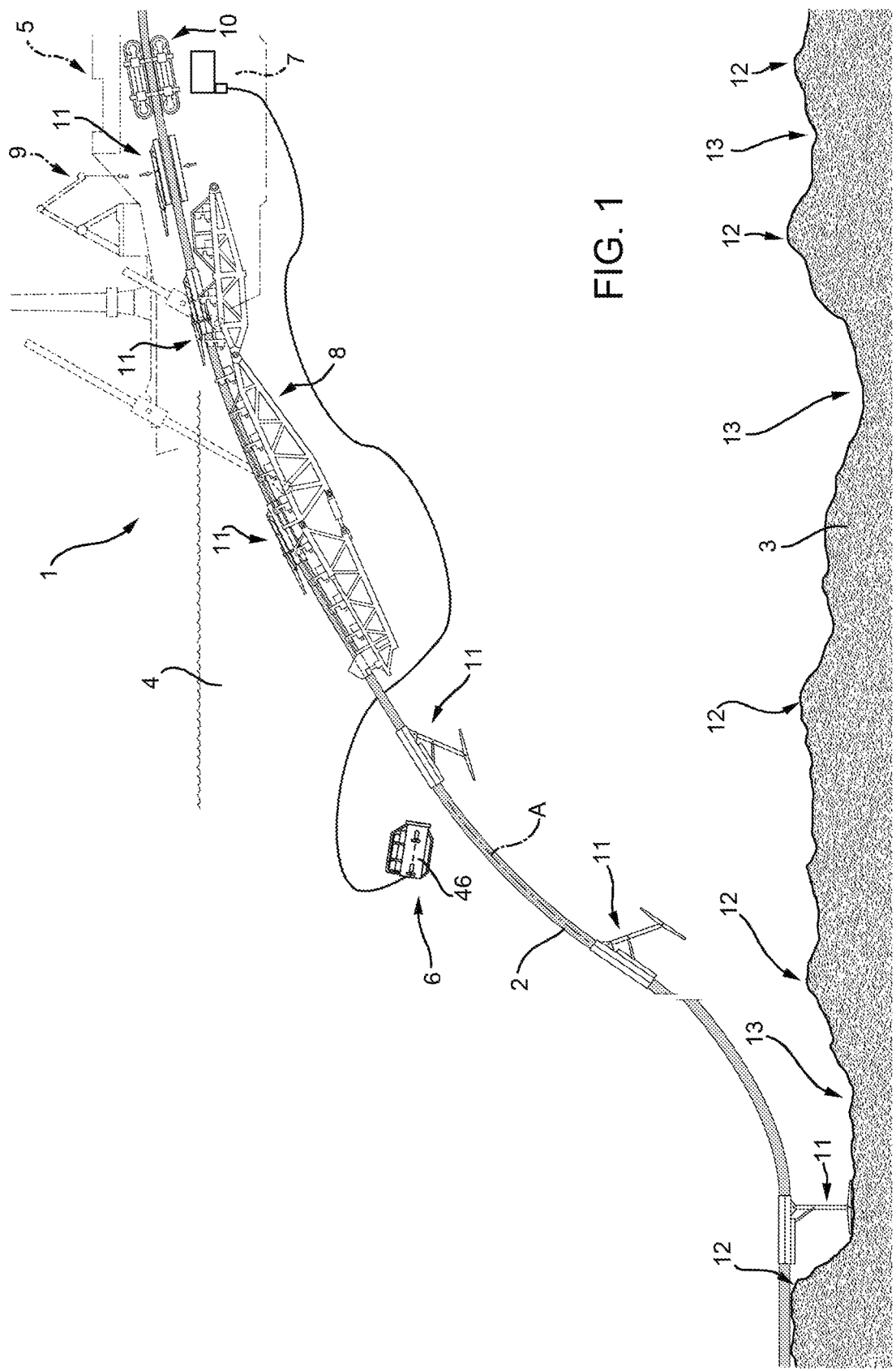
FIG. 1 is an elevation view, with parts shown schematically and parts removed for clarity, of a system configured to lay an underwater pipeline and supports of the underwater pipeline on a bed of the body of water.

Referring now to the example embodiments of the present disclosure illustrated in FIGS. 1 to 12, referring to FIG. 1, a system 1 is shown, as a whole, for laying an underwater pipeline 2 on a bed 3 of a body of water 4.

The system 1 comprises a laying vessel 5 assigned to launching and laying the underwater pipeline 2; and an underwater vehicle 6 mainly assigned to controlling the steps of launching and/or laying the underwater pipeline 2.

The underwater pipeline 2 extends along a longitudinal axis A, is made by joining steel tubes assembled together on board the laying vessel 5, and is covered by at least a layer of polymer material.

The laying vessel 5 comprises a floating structure 7; a launching ramp 8 hinged to the floating structure 7; a crane 9 arranged along the floating structure 7; and a braking device 10 configured to control the release of the underwater pipeline 2.

The system 1 also has the function of laying at least one support 11 configured to support the underwater pipeline 2 in an elevated position with respect to the bed 3 of the body of water 4.

In the case shown in FIG. 1, the bed 3 of the body of water 4 comprises an irregular bathymetric profile with ridges 12 and depressions 13. In general, the morphology of the part of the bed 3 shown is characterized by abrupt bathymetric variations.

The system 1 envisages fitting one or more supports 11 on the underwater pipeline 2 via the crane 9 on board the laying vessel 5 and laying the support 11 on the bed 3 through the controlled release of the underwater pipeline 2. In other words, the underwater pipeline 2 is the tool through which the correct positioning of the supports 11 is controlled. The quantity or number of supports 11 fitted on the underwater pipeline 2 depends on the span of the depressions and the structural characteristics of the underwater pipeline 2.

Figure 4:
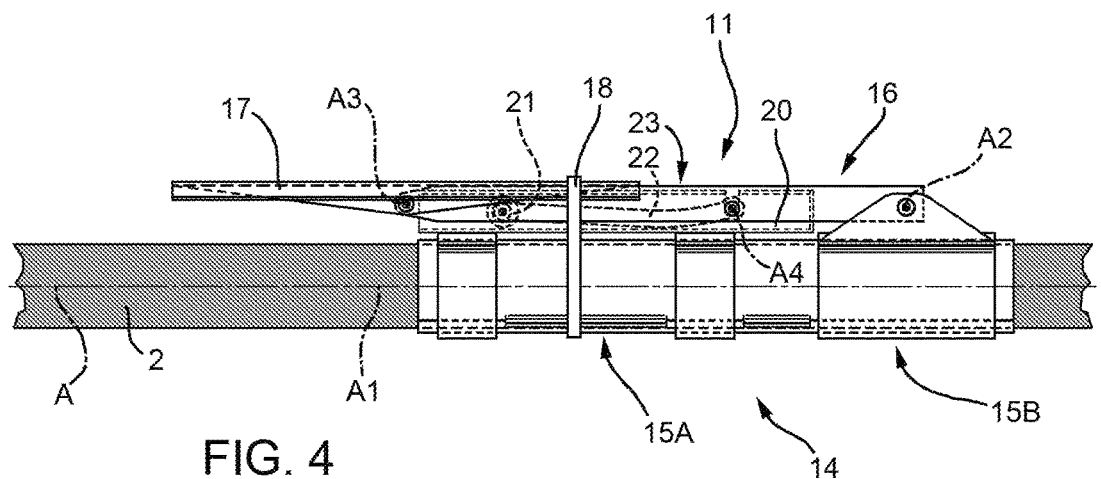
FIG. 4 is an elevation view, with parts removed for clarity and on an enlarged scale, of a support in FIG. 1 in a contracted configuration.
Figure 5:
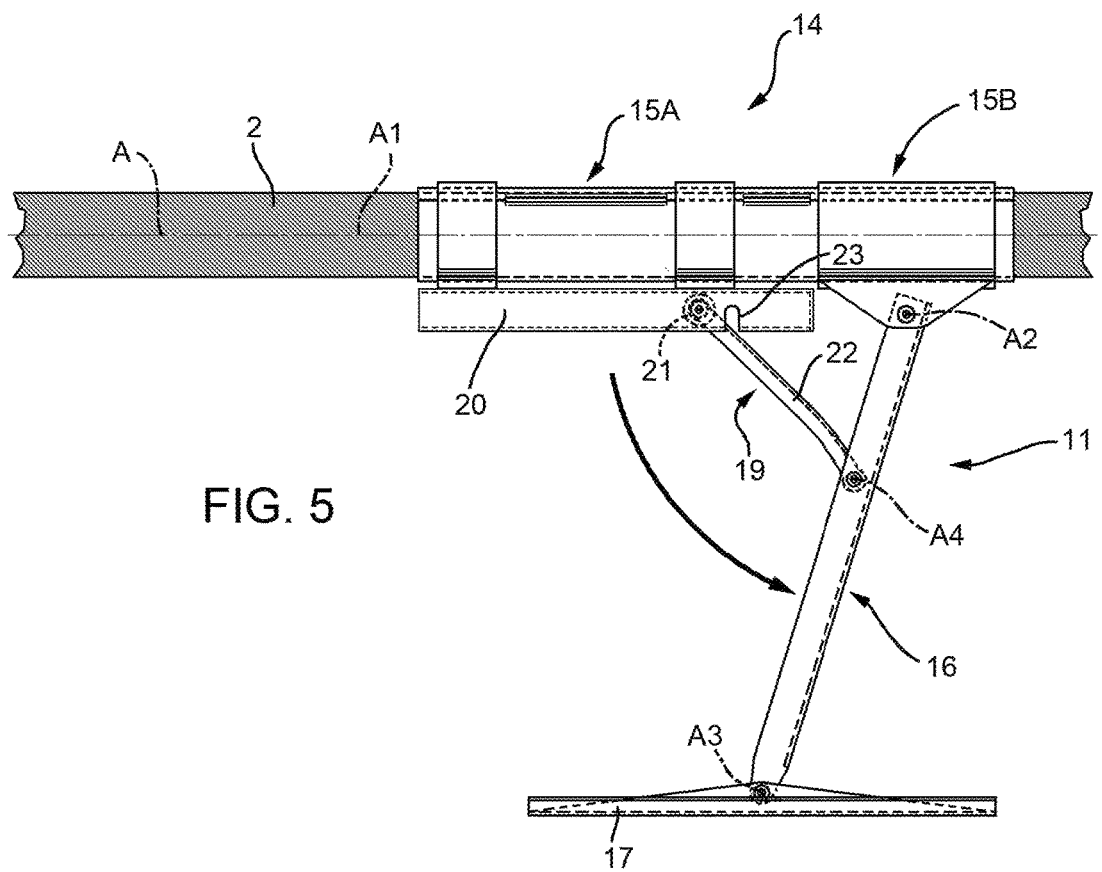
FIG. 5 is an elevation view, with parts removed for clarity, parts in section and on an enlarged scale, of the support in FIG. 1 in an extended configuration.

The support 11 has a variable configuration and is able to pass from a contracted configuration (FIGS. 4 and 6) to an extended configuration (FIGS. 5 and 7). The contracted configuration enables the support 11 to be easily stored and transported, especially along the launching ramp 8. The extended configuration is the operational configuration in which the support 11, resting on the bed 3, sustains the underwater pipeline 2.

The transition from the contracted configuration to the extended configuration occurs along the spanned portion of the underwater pipeline 2 between the launching ramp 8 and the bed 3 of the body of water 4.

Figure 2:
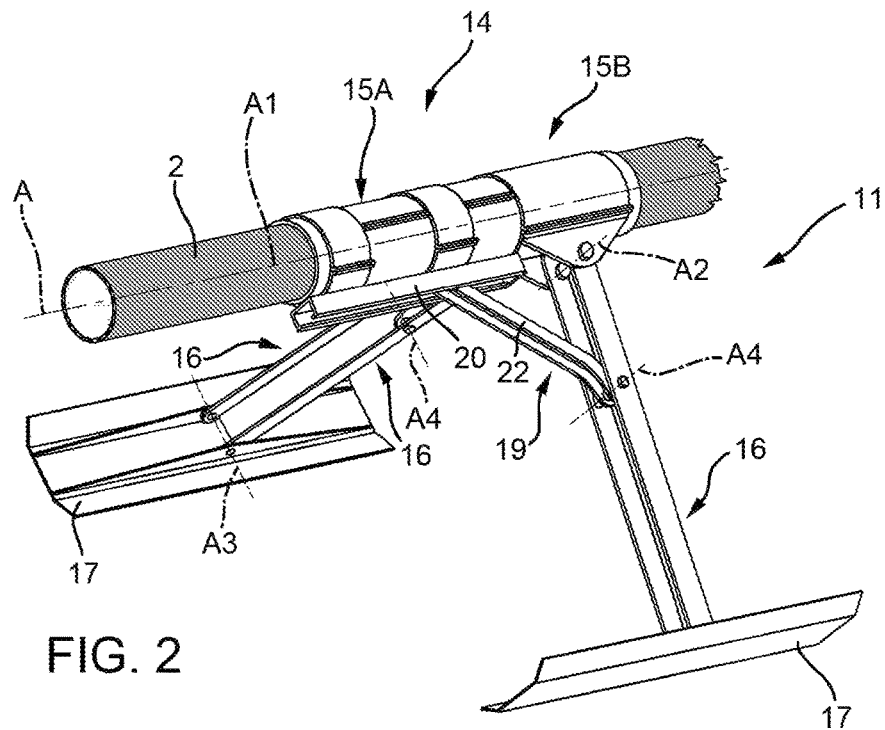
FIG. 2 is a perspective view, with parts removed for clarity and on an enlarged scale, of a support in FIG. 1 in an extended configuration.

Referring to FIG. 2, each support 11 is shaped like a foldable trestle and comprises a connecting frame 14 configured to be fitted to a portion of the underwater pipeline 2; and two legs 16, which are hinged to the connecting frame 14 and movable between a contracted configuration and an extended configuration in which they extend crosswise to the underwater pipeline 2 to rest on the bed 3 of the body of water 4 (FIG. 1).

In particular, the connecting frame 14 comprises a gripping member 15A, which extends around an axis A1 and can be coupled to the underwater pipeline 2 so as to substantially align axes A and A1, and a hub 15B, which is coupled to the gripping member 15A in a rotatable manner about axis A1 and supports the legs 16. In consequence, the hub 15B and the legs 16 can rotate about the longitudinal axis A of the underwater pipeline 2.

Each leg 16 has one end hinged to the hub 15B about an axis A2 crosswise to longitudinal axis A and to axis A1, such that in the contracted configuration (FIG. 4), each leg 16 can be arranged parallel to the underwater pipeline 2. Axis A1 and each axis A2 lie on respective mutually perpendicular planes, such that in the contracted position, each leg 16 can be arranged substantially parallel to axis A1, while in the extended configuration, the leg extends mainly in the radial direction with respect to axis A1.

Each leg 16 has another end hinged to a foot 17 about an axis A3 substantially parallel to axis A2. In the contracted position (FIG. 4), each supporting foot 17 is arranged substantially parallel to the respective leg 16, while in the extended position, each supporting foot extends crosswise to the respective leg 16. When the support 11, in the extended configuration, is rested on the bed 3 (FIG. 1), each foot 17 turns about axis A3, so as to adapt itself to the configuration of the bed 3.

Figure 3:
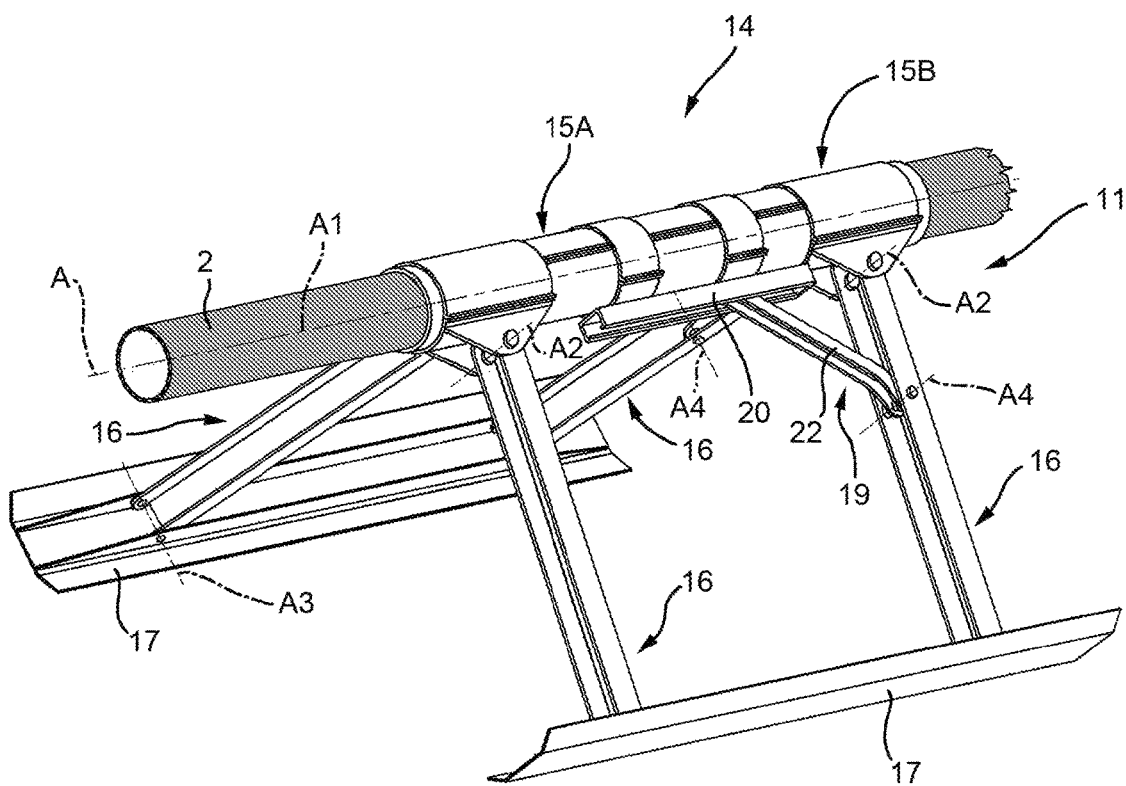
FIG. 3 is an elevation view, with parts removed for clarity, of a variant of the support shown in FIG. 2.

Referring to the variant in FIG. 3, the support 11 comprises four legs 16 subdivided into two pairs of legs 16. Each pair of legs 16 is hinged to the hub 15B and to a supporting foot 17 and, together with the hub 15B and the supporting foot 17, forma an articulated quadrilateral.

Referring to FIG. 1, each support 11 is fitted on the underwater pipeline 2 upstream of the launching ramp 8 in the contracted configuration and with the legs 16 arranged along the upper part of the underwater pipeline 2 so as not to obstruct the passage of the underwater pipeline 2 along the launching ramp 8. In this step and with reference to FIG. 4, the rotation of the hub 15B about axis A1, the rotation of the legs 16 about axes A2, and the rotation of the supporting feet 17 about axes A3 are prevented by a lock member 18, which in the case shown is defined by a releasable band wrapped around the feet 17 and the legs 16, and which is released once the support 11 is downstream of the launching ramp 8 (FIG. 1). The release of the lock member 18 is controlled by the underwater vehicle 6 (FIG. 1).

Referring to FIG. 5, the support 11 has a stop device 19 to arrest the legs 16 in the extended configuration. In the case shown, the stop device 19 comprises, for each leg 16, a guide 20 integral with the hub 15B and parallel to axis A1; a runner 21 sliding in the guide 20 parallel to axis A1 an arm 22 having one end hinged to the leg 16 about an axis A4 parallel to axis A2 and the other end hinged to the runner 21; and a non-return mechanism 23 that enables stopping runner 21 in a certain position when resting the support 11 on the bed 3.

In the case shown, the non-return mechanism 23 is defined by a catch-like mechanical mechanism that, by engaging in a specially provided seat, prevents the runner 21 from returning towards the closed position.

In accordance with a first embodiment, once the lock member 18 shown in FIG. 4 is removed, the support 11 is able to pass from the contracted configuration to the extended configuration simply under the action of the force of gravity. The removal of the lock member 18 enables the rotation of the hub 15B about axis A1 until the legs 16 are arranged beneath the underwater pipeline 2 (FIG. 5). This rotation is facilitated by the asymmetry of the support 11 about axis A1, even when the support 11 is arranged in the contracted configuration. When the legs 16 and feet 17 are arranged beneath the underwater pipeline 2, their weight causes rotation about axes A3 and A4. The legs 16 will assume a substantially vertical position, while the supporting feet 17, which are hinged at their midpoints, will assume a substantially horizontal position.

As the portion of underwater pipeline 2 equipped with a support 11 approaches the bed 3, the underwater pipeline 2 reduces its inclination to the horizontal, the legs 16 increase their inclination with respect to the hub 15B, and the runner 21 moves nearer to the non-return mechanism 23 (FIG. 5). Once the runner 21 has engaged the non-return mechanism 23, the legs 16 are arrested in the extended position.

Figure 8:
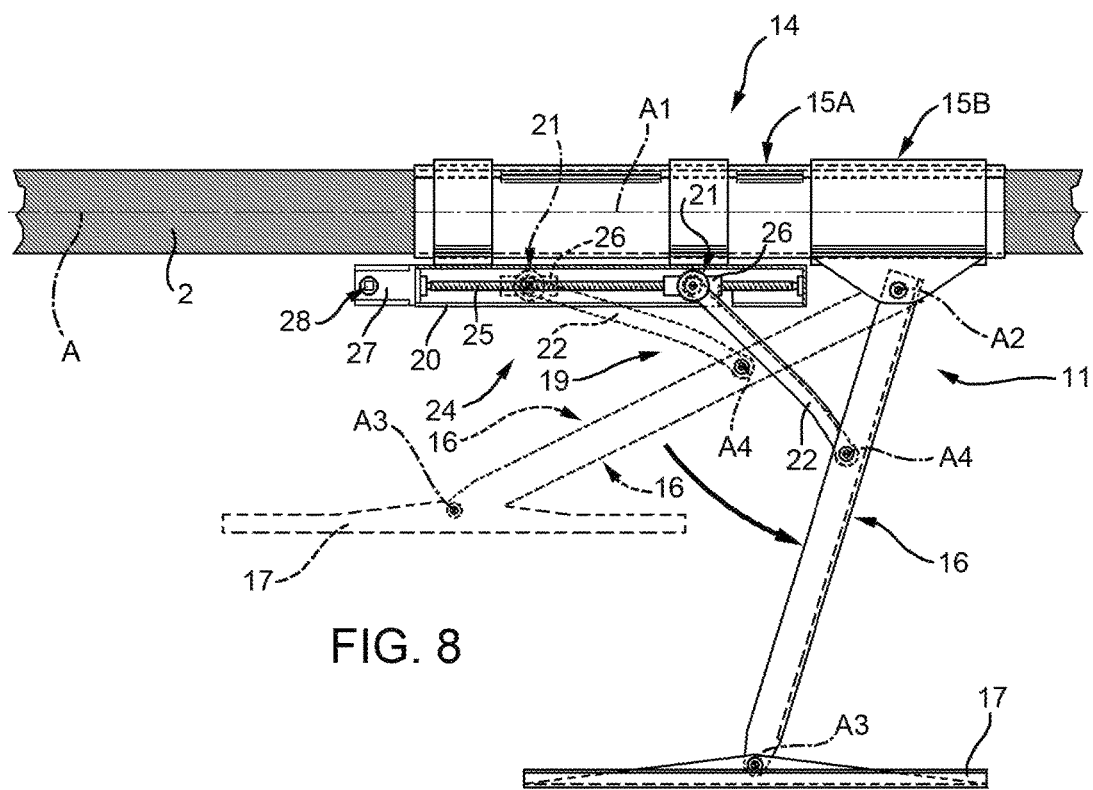
FIG. 8 is an elevation view, with parts removed for clarity and parts in section, of a second embodiment of the support in FIG. 1.

Referring to the embodiment in FIG. 8, the support 11 comprises an opening mechanism 24 to move the legs 16 from the contracted position to the extended position.

The opening mechanism 24 comprises a screw 25 and a nut screw 26 connected to the screw 25 and to the runner 21 so that nut screw 26 performs linear movements together with the runner 21 based on the rotation of the screw 25.

In the case in point, the screw 25 is connected to a reducer 27 equipped with a power take-off connection 28 connectable to the underwater vehicle 6 (FIG. 1), which operates the screw 25 to open the support 11.

Figure 9:
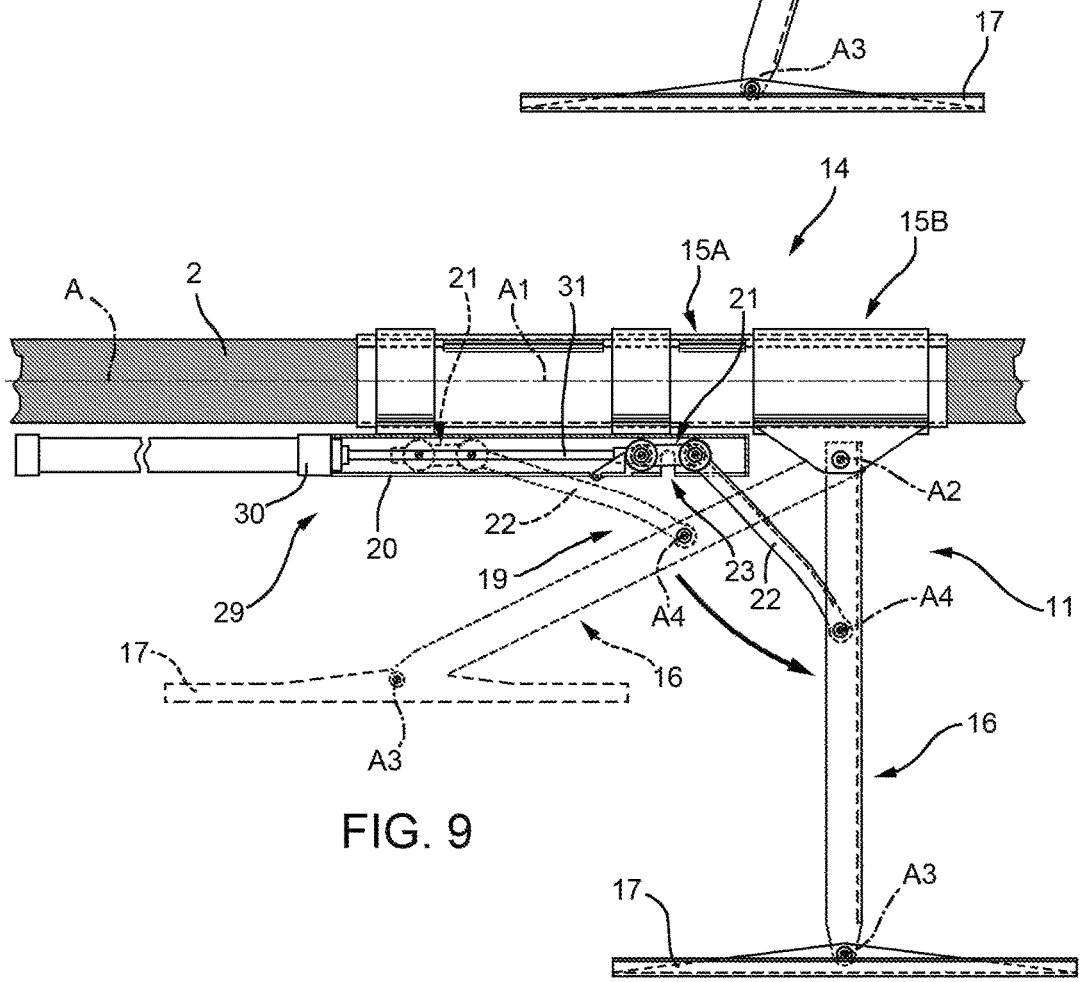
FIG. 9 is an elevation view, with parts removed for clarity and parts in section, of a third embodiment of the support in FIG. 1.

Referring to the embodiment in FIG. 9, the support 11 comprises an opening mechanism 29 that comprises a hydraulic cylinder 30 comprising a rod 31, the free end of which is connected to the runner 21. The hydraulic cylinder 30 is mechanically irreversible and comprises a non-return mechanism integrated in the hydraulic cylinder 30 (not shown in the accompanying figures). In this case, operation of the hydraulic cylinder 30 is also performed by the underwater vehicle 6 (FIG. 1), after setting up a hydraulic connection between the underwater vehicle 6 (FIG. 1) and the hydraulic cylinder 30.

Figure 10:
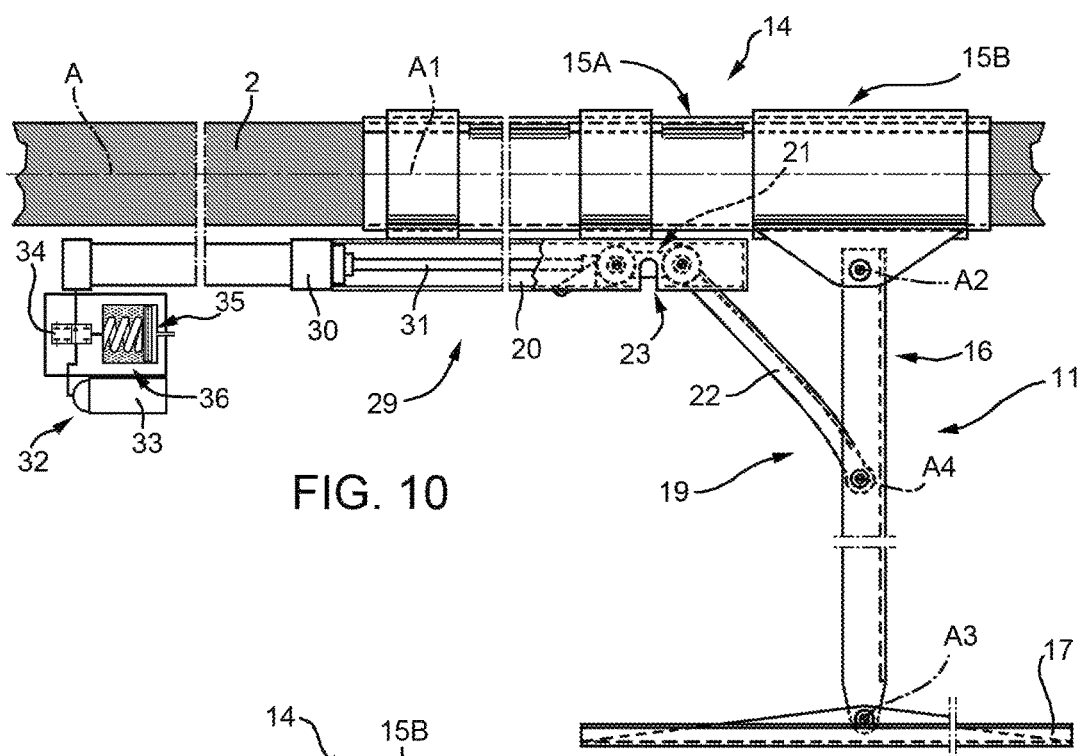
FIG. 10 is an elevation view, with parts removed for clarity and parts indicated schematically, of a third embodiment of the present disclosure.

Referring to the embodiment in FIG. 10, in addition to the opening mechanism 29, the support 11 comprises an automatic device 32 capable of providing the hydraulic cylinder 30 with the pressurized fluid necessary to cause operation of the rod 31.

In the case shown, the automatic device 32 comprises a reservoir 33 configured to hold a pressurized fluid and hydraulically connectable to the hydraulic cylinder 30; an on-off valve 34; a pressure sensor 35; and a mechanical transducer 36 to operate the valve 34 based on the pressure acting on the sensor 35.

In practice, the automatic device 32 is able to hydraulically connect the reservoir 33 to the hydraulic cylinder 30 based on the depth of the support 11 in the body of water 4 (FIG. 1) and, therefore, on the pressure of the body of water 4 that acts on the automatic device 32.

Figure 11:
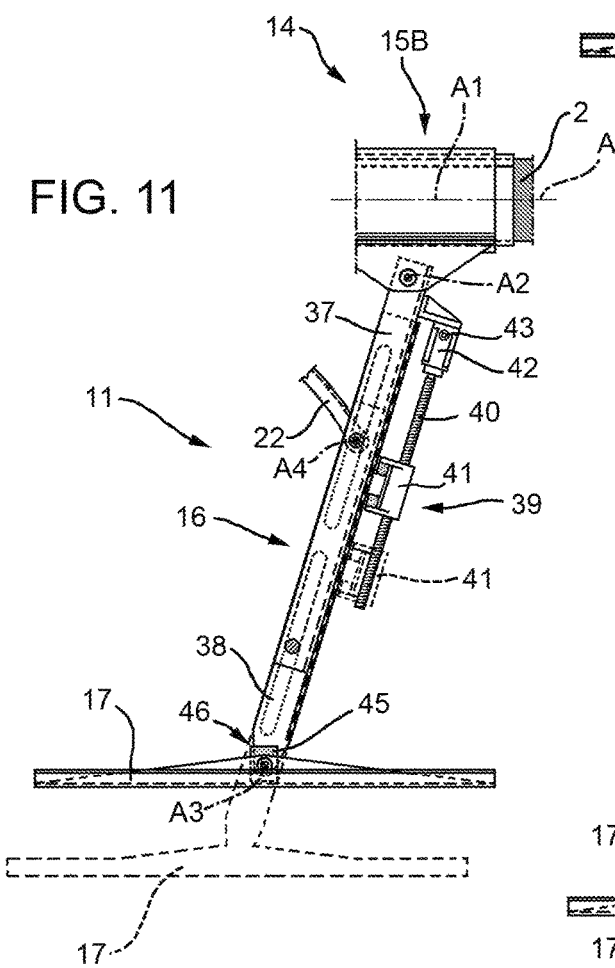
FIGS. 11 and 12 are elevation views, with parts removed for clarity and parts shown schematically, of two variants of the supports in FIG. 1.
Figure 12:
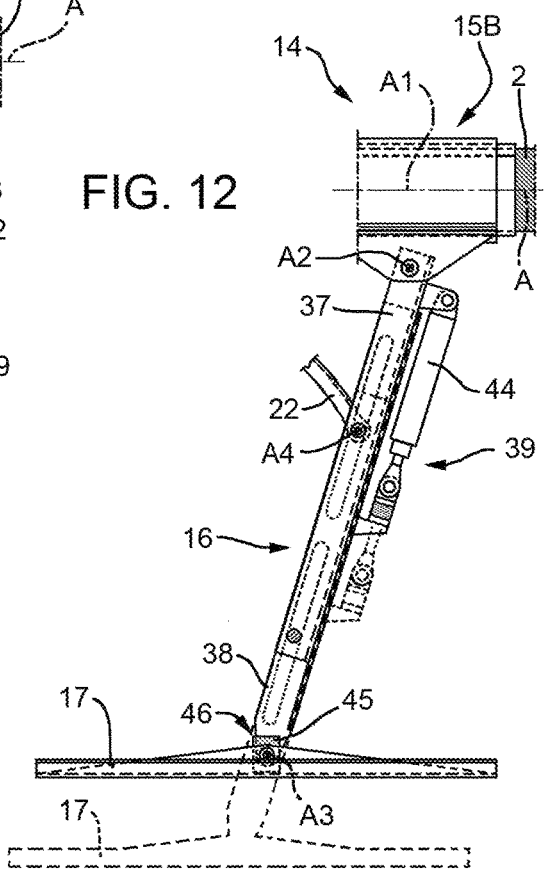

Referring to the variants in FIGS. 11 and 12, each leg 16 is adjustable in length. In fact, each leg 16 comprises two elongated members 37 and 38 telescopically coupled together and an adjusting mechanism 39 connected to both the elongated members 37 and 38.

In FIG. 11, the adjusting mechanism 39 comprises a screw 40; a nut screw 41; a reducer 42; and a power take-off connection 43 to create a connection with an underwater vehicle 6 (FIG. 1).

In FIG. 12, the adjusting mechanism 40 comprises a hydraulic cylinder 44, which has a hydraulic connector (not shown in the accompanying figures) configured for connecting to the underwater vehicle 6 in FIG. 1 and of the irreversible type.

The height adjustment of the legs 16 enables adjusting the height of the support 11 so that the support 11 effectively supports the underwater pipeline 2. Furthermore, adjustment of the length of the legs 16 enables distributing the load of the underwater pipeline 2 between the legs 16 in a balanced manner.

To this end, the legs 16 are provided with sensors 45 to acquire signals related to the load along the legs 16. In practice, each leg 16 comprises a sensor 45 configured to output a signal related to the load transmitted along the respective leg 16.

The load-related signals of the respective legs 16 are transmitted to the underwater vehicle 6 (FIG. 1), where a control unit 46 (FIG. 1) compares the signals and outputs control signals to lengthen or shorten one or both of the legs 16 so that the acquired signals fall within a predetermined range.

Finally, it is evident that variants can be made to the present disclosure with respect to the embodiments described with reference to the accompanying drawings without departing from the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An underwater pipeline support comprising:
   a connecting frame extending along a first axis, said connecting frame configured to fit to a portion of a pipeline extending along a longitudinal axis, wherein when fitted, the first axis is substantially parallel to the longitudinal axis of the pipeline;
   a leg moveably connected to the connecting frame about a second axis crosswise to the first axis, said leg being movable from a contracted configuration in which the leg is substantially parallel to the pipeline to an extended configuration in which said leg extends crosswise to the pipeline; and
   a stop device configured to arrest the leg in the extended configuration.

2. The underwater pipeline support of claim 1, wherein the connecting frame comprises a gripping member and a hub configured to support the leg and mounted to rotate relative to the gripping member.

3. The underwater pipeline support of claim 1, further comprising a foot configured to rest on a bed of a body of water, wherein said foot is moveably connected to an end of the leg about a third axis, and said foot is movable from a contracted position in which said foot is substantially parallel to the leg to an operational position in which said foot extends crosswise to the leg.

4. The underwater pipeline support of claim 1, wherein a length of the leg is adjustable.

5. The underwater pipeline support of claim 4, wherein the leg comprises an adjusting mechanism configured to cause an adjustment of the length of said leg.

6. The underwater pipeline support of claim 5, wherein the adjusting mechanism comprises a power take-off connection.

7. The underwater pipeline support of claim 5, further comprising at least one sensor configured to detect a signal related to a load applied along said leg.

8. The underwater pipeline support of claim 1, wherein the stop device comprises:
- a guide;
- a runner movable along the guide;
- an arm hinged to the runner and to the leg; and
- a non-return mechanism located along the guide and configured to form a coupling with the runner.

9. The underwater pipeline support of claim 1, further comprising an opening mechanism configured to move the leg from the contracted configuration to the extended configuration.

10. The underwater pipeline support of claim 9, wherein the opening mechanism comprises a screw and a nut screw movable along the screw and connected to the leg.

11. The underwater pipeline support of claim 1, wherein the leg is hinged to the connecting frame about the second axis.

12. The underwater pipeline support of claim 1, comprising at least two legs including the leg, which are moveably connected to the connecting frame about at least two respective second axes, each leg being movable from a contracted configuration to an extended configuration in which said leg extends crosswise to the pipeline.

13. The underwater pipeline support of claim 12, further comprising at least two feet, each foot being configured to rest on a bed of a body of water, wherein each foot is moveably connected to an end of a respective leg about a third axis, and each foot is movable between a contracted position in which said foot is substantially parallel to the respective leg, and an operational position in which said foot extends crosswise to the respective leg.

14. An underwater pipeline laying system comprising:
- a laying vessel; and
- a crane configured to, within a predetermined area on a bed of a body of water, fit a support to a designated portion of a pipeline on the laying vessel, said support comprising:
  - a connecting frame extending along a first axis, said connecting frame configured to fit to the designated portion of the pipeline extending along a longitudinal axis, wherein when fitted, the first axis is substantially parallel to the longitudinal axis of the pipeline;
  - a leg moveably connected to the connecting frame about a second axis crosswise to the first axis, said leg being movable from a contracted configuration in which the leg is substantially parallel to the pipeline to an extended configuration in which said leg extends crosswise to the pipeline; and
  - a stop device configured to arrest the leg in the extended configuration.

15. The underwater pipeline laying system of claim 14, further comprising a lock member configured to keep the support in the contracted configuration, wherein the lock member is selectively removable to enable the support to assume the extended configuration.

16. The underwater pipeline laying system of claim 14, further comprising an underwater vehicle configured to, at least one of: assist laying of the support and supply power to the support.

17. The underwater pipeline laying system of claim 14, wherein the leg is hinged to the connecting frame about the second axis.

18. The underwater pipeline laying system of claim 14, wherein the support comprises at least two legs including the leg, which are moveably connected to the connecting frame about at least two respective second axes, each leg being movable from a contracted configuration to an extended configuration in which said leg extends crosswise to the pipeline.

19. An underwater pipeline support comprising:
- a connecting frame extending along a first axis, said connecting frame configured to fit to a portion of a pipeline extending along a longitudinal axis, wherein when fitted, the first axis is substantially parallel to the longitudinal axis of the pipeline; and
- a leg moveably connected to the connecting frame about a second axis crosswise to the first axis, said leg being movable from a contracted configuration in which the leg is substantially parallel to the pipeline to an extended configuration in which said leg extends crosswise to the pipeline, wherein said leg is moveably connected to the connecting frame such that a transition from the contracted configuration to the extended configuration occurs by gravity following a release of a free end of said leg.

20. The underwater pipeline support of claim 19, wherein the connecting frame comprises a gripping member and a hub configured to support the leg and mounted to rotate relative to the gripping member.

21. The underwater pipeline support of claim 19, further comprising a foot configured to rest on a bed of a body of water, wherein said foot is moveably connected to an end of the leg about a third axis, and said foot is movable from a contracted position in which said foot is substantially parallel to the leg to an operational position in which said foot extends crosswise to the leg.

22. The underwater pipeline support of claim 19, wherein a length of the leg is adjustable.

23. The underwater pipeline support of claim 22, wherein the leg comprises an adjusting mechanism configured to cause an adjustment of the length of said leg.

24. The underwater pipeline support of claim 23, wherein the adjusting mechanism comprises a power take-off connection.

25. The underwater pipeline support of claim 23, further comprising at least one sensor configured to detect a signal related to a load applied along said leg.

26. The underwater pipeline support of claim 19, wherein the leg is hinged to the connecting frame about the second axis.

27. The underwater pipeline support of claim 19, comprising at least two legs including the leg, which are moveably connected to the connecting frame about at least two respective second axes, each leg being movable from a contracted configuration to an extended configuration in which said leg extends crosswise to the pipeline.

28. The underwater pipeline support of claim 27, further comprising at least two feet, each foot being configured to rest on a bed of a body of water, wherein each foot is moveably connected to an end of a respective leg about a third axis, and each foot is movable between a contracted position in which said foot is substantially parallel to the respective leg, and an operational position in which said foot extends crosswise to the respective leg.

29. An underwater pipeline support comprising:
- a connecting frame extending along a first axis, said connecting frame configured to fit to a portion of a pipeline extending along a longitudinal axis, wherein when fitted, the first axis is substantially parallel to the longitudinal axis of the pipeline;

a leg moveably connected to the connecting frame about a second axis crosswise to the first axis, said leg being movable from a contracted configuration in which the leg is substantially parallel to the pipeline to an extended configuration in which said leg extends crosswise to the pipeline; and an opening mechanism including a hydraulic cylinder comprising a rod connected to the leg and an automatic device configured to activate the hydraulic cylinder based on a pressure in a body of water, wherein the opening mechanism is configured to move the leg from the contracted configuration to the extended configuration.

30. The underwater pipeline support of claim 29, wherein the opening mechanism comprises:

a reservoir;

a valve between the reservoir and the hydraulic cylinder;

a pressure sensor; and a transducer configured to open the valve based on a pressure value.

31. The underwater pipeline support of claim 29, wherein the connecting frame comprises a gripping member and a hub configured to support the leg and mounted to rotate relative to the gripping member.

32. The underwater pipeline support of claim 29, further comprising a foot configured to rest on a bed of the body of water, wherein said foot is moveably connected to an end of the leg about a third axis, and said foot is movable from a contracted position in which said foot is substantially parallel to the leg to an operational position in which said foot extends crosswise to the leg.

33. The underwater pipeline support of claim 29, wherein a length of the leg is adjustable.

34. The underwater pipeline support of claim 33, wherein the leg comprises an adjusting mechanism configured to cause an adjustment of the length of said leg.

35. The underwater pipeline support of claim 34, wherein the adjusting mechanism comprises a power take-off connection.

36. The underwater pipeline support of claim 34, further comprising at least one sensor configured to detect a signal related to a load applied along said leg.

37. The underwater pipeline support of claim 29, wherein the leg is hinged to the connecting frame about the second axis.

38. The underwater pipeline support of claim 29, comprising at least two legs including the leg, which are moveably connected to the connecting frame about at least two respective second axes, each leg being movable from a contracted configuration to an extended configuration in which said leg extends crosswise to the pipeline.

39. The underwater pipeline support of claim 38, further comprising at least two feet, each foot being configured to rest on a bed of the body of water, wherein each foot is moveably connected to an end of a respective leg about a third axis, and each foot is movable between a contracted position in which said foot is substantially parallel to the respective leg, and an operational position in which said foot extends crosswise to the respective leg.

* * * * *